(12) United States Patent
Maheshwari

(10) Patent No.: US 8,570,552 B2
(45) Date of Patent: Oct. 29, 2013

(54) APPARATUS AND METHOD TO RETRIEVE PRINT OPTIONS FROM PRINT FILE MORE PARTICULARLY, TO ADD THE RETRIEVED PRINT OPTIONS AS BOOKMARKS

(75) Inventor: Naveen Maheshwari, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1186 days.

(21) Appl. No.: 12/044,022

(22) Filed: Mar. 7, 2008

(65) Prior Publication Data
US 2009/0027708 A1   Jan. 29, 2009

(30) Foreign Application Priority Data

Jul. 26, 2007  (KR) .................... 2007-75184

(51) Int. Cl.
*G06F 3/12* (2006.01)
*G06F 15/16* (2006.01)
*G06F 15/167* (2006.01)
*G06K 15/00* (2006.01)
*H04N 1/00* (2006.01)

(52) U.S. Cl.
USPC ......... 358/1.15; 358/1.1; 358/1.13; 358/1.16; 358/403; 709/201; 709/213; 709/217; 709/230

(58) Field of Classification Search
USPC ........ 358/1.13, 1.1, 1.16, 1.15, 403, 442, 1.9, 358/402, 3.01, 518, 3.28, 1.18, 2.1, 501, 358/3.24, 3.32, 1.2, 1.6; 709/609, 602, 627, 709/648, 665, 668, 674, 705, 706, 708, 715, 709/716, 729, 731, 736, 741, 755, 769, 802, 709/821, 822, 201, 203, 218, 212, 238, 223, 709/225, 707, 213, 216, 226, 245, 246, 709/248; 715/200, 210, 273, 700, 737, 741, 715/746, 763, 809

See application file for complete search history.

(56) References Cited

U.S. PATENT DOCUMENTS

| | | | | |
|---|---|---|---|---|
| 6,791,703 | B1* | 9/2004 | Maeda et al. | 358/1.15 |
| 7,366,980 | B2* | 4/2008 | Small | 715/248 |
| 7,664,825 | B2* | 2/2010 | Yeung et al. | 709/217 |
| 2002/0196460 | A1* | 12/2002 | Parry | 358/1.15 |
| 2005/0128501 | A1* | 6/2005 | Choi et al. | 358/1.13 |
| 2005/0248800 | A1* | 11/2005 | Choi | 358/1.13 |
| 2006/0156229 | A1* | 7/2006 | Morgan | 715/527 |
| 2008/0062199 | A1* | 3/2008 | Maheshwari | 345/630 |

FOREIGN PATENT DOCUMENTS

| | | |
|---|---|---|
| JP | 03-61562 | 3/1991 |
| JP | 10-326167 | 12/1998 |
| KR | 2005-47764 | 5/2005 |

* cited by examiner

*Primary Examiner* — Ngon Nguyen
(74) *Attorney, Agent, or Firm* — Stanzione & Kim, LLP

(57) ABSTRACT

An apparatus and a method of retrieving print option from a print file include a converting unit to convert a document to print and print options set for the document to print into a print file recognizable at an image forming apparatus, and a driver control unit to retrieve the print options from the print file.

21 Claims, 4 Drawing Sheets

APPARATUS AND METHOD TO RETRIEVE PRINT OPTIONS FROM PRINT FILE MORE PARTICULARLY, TO ADD THE RETRIEVED PRINT OPTIONS AS BOOKMARKS

CROSS-REFERENCE TO RELATED APPLICATIONS

This application claims priority under 35 U.S.C. §119 (a) from of Korean Patent Application No. 10-2007-0075184, filed on Jul. 26, 2007, in the Korean Intellectual Property Office, the disclosure of which is hereby incorporated herein in its entirety by reference.

BACKGROUND OF THE INVENTION

1. Field of the Invention

The present general inventive concept relates to an apparatus and a method to retrieve print options from a print file, and more particularly, to an apparatus and a method to retrieve print options from a print file and add the retrieved print options as bookmarks.

2. Description of the Related Art

A printer driver generally operates to convert a document written on an application program into print data recognizable by an image forming apparatus. Such printer driver provides a print option setting menu to provide options for printing pages, paper type, printing direction, or the like.

A user of an image forming apparatus is thus able to set print options through the print option set menu before printing a document. The printer driver converts the set print options and the document into data that can be recognized by the image forming apparatus and sends the data to the image forming apparatus. As a result, the image forming apparatus prints out the data of the original document based on the print options as set by the user.

However, there is shortcoming in that user has to go through the setting of the print options all over again, even if the user wants to print out the same document, or different document, using the previously set print options. The user generally does not remember all details of the previous print options and so may have trial and errors. It would be convenient if users can set the previously set print options through the print option set menu in a simple process.

SUMMARY OF THE INVENTION

The present general inventive concept provides an apparatus and a method to retrieve previously used print options from a print file and to add the retrieved print options to a bookmark list, which thereby increases user convenience.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing an apparatus to retrieve print options. The apparatus to retrieve print options may include a converting unit to convert a document to print, and a set of print options selected for the document to print, into a print file recognizable at an image forming apparatus, and a driver control unit to retrieve the set of print options from the print file.

The apparatus may further include a graphic user interface (GUI) generating unit to generate a print option setting menu to set print option for the document to print, and to receive a command to retrieve the set print option.

The GUI generating unit may generate a popup window to select a print file from which the set of print options is to be retrieved, in response to the command to retrieve the print options.

The GUI generating unit may generate the popup window that includes an area to receive a name of the retrieved set of print options to add to the bookmark list.

The driver control unit may name the retrieved set of print option automatically or gives a name based on the corresponding print options, and display the name of the retrieved set of print options in the area.

The GUI generating unit may generate the print option setting menu which displays a bookmark list.

The driver control unit may add the retrieved set of print options to a bookmark list.

The apparatus may further include a storage unit to additionally store the retrieved set of print options to the bookmark list.

The foregoing and other aspects and utilities of the present general inventive concept may also be achieved by providing a method for retrieving print options. The method for retrieving print options may include converting a document to print and print options set for the document to print into a print file recognizable at an image forming apparatus, and retrieving the print options from the print file.

The method may further include generating a print option setting menu to set print option for the document to print, and to receive a command to retrieve the set print option.

The method may further include displaying a popup window to select a print file from which the set of print options is to be retrieved, in response to the command to retrieve the set of print options.

The popup window may include an area to receive a name of the retrieved set of print options to add to the bookmark list.

The generating and displaying may include naming the retrieved set of print options automatically or giving a name based on the corresponding print options, and displaying the name of the retrieved set of print options in the area.

The displaying the print option setting menu may include generating the print option setting menu which displays the bookmark list.

The method may further include adding the retrieved set of print options to a bookmark list.

The method may further include additionally storing the retrieved set of print options to the bookmark list.

The foregoing and other aspects and utilities of the present general inventive concept may also be achieved by providing a computer-readable medium to contain computer-readable codes as a program to execute a method of retrieving print options in an image forming system, the method including converting a document to print and one or more print options set for the document to print, into a print file recognizable at an image forming apparatus, and retrieving the print options from the print file.

The foregoing and other aspects and utilities of the present general inventive concept may also be achieved by providing an image forming system including a control unit to generate a bookmark list including one or more bookmarks each corresponding to a set of one or more print options, and a GUI generating unit to generate a window including the bookmark list to be displayed.

The image forming system may further include a GUI generating unit to generate a window to include the one or more print options, and the window may include the bookmark list, and when one of the bookmarks is selected from the bookmark list, the one or more print options may be automatically set according to the selected bookmark.

The image forming system may further include a driver control unit to retrieve one of the bookmarks from the bookmark list, to set the one or more print options according to the selected bookmark, and to transmit the one or more print options and printing data to an image forming apparatus.

The foregoing and other aspects and utilities of the present general inventive concept may also be achieved by providing a method of an image forming system, the method including converting a document to print, and a set of one or more print options selected for the document to print, into a print file recognizable at an image forming apparatus, generating a bookmark list including one or more bookmarks, and retrieving the set of print options from the respective bookmarks, so that the document and the retrieved set of the print options associated with the document are converted into the print file.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
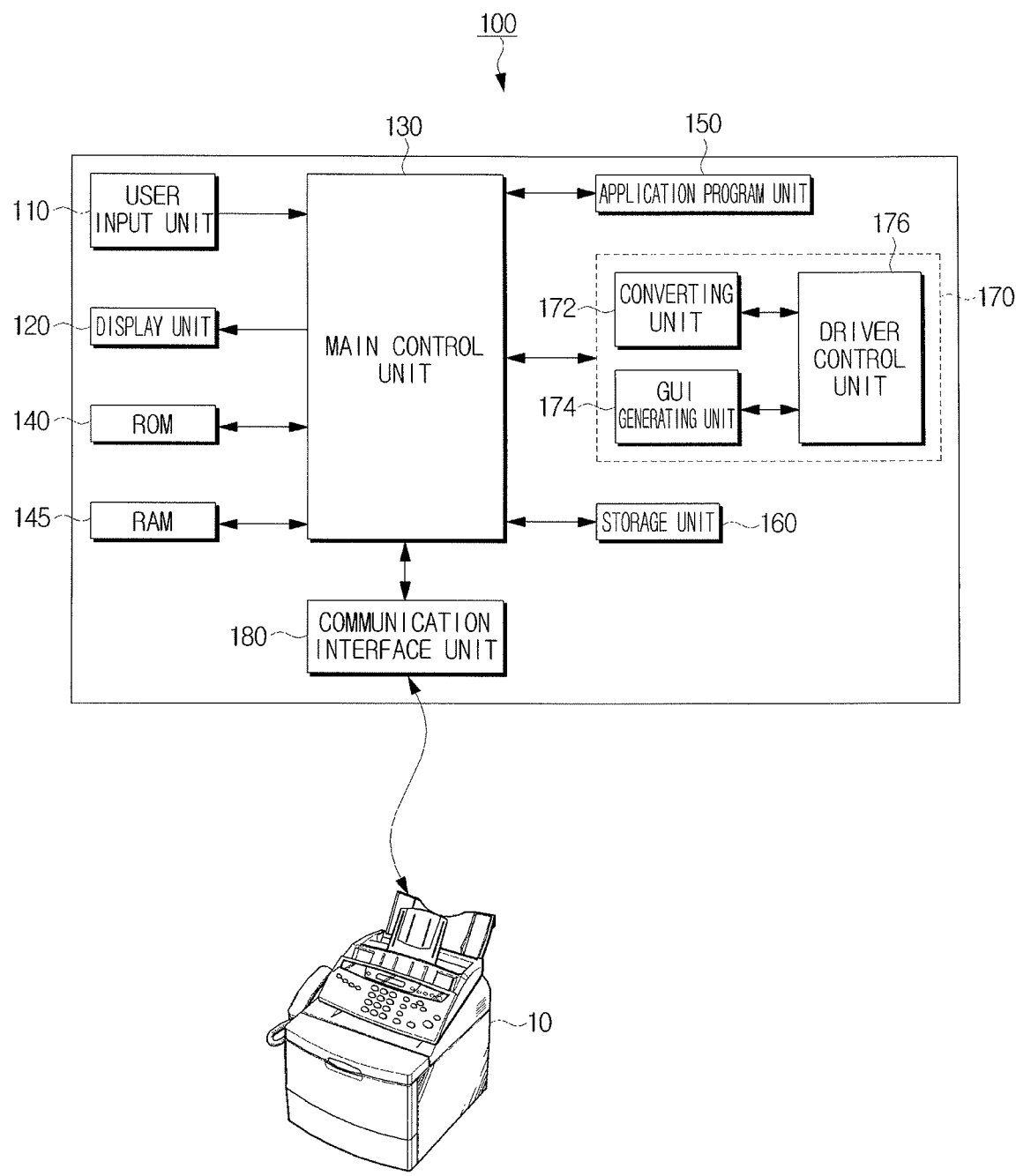
FIG. 1 is a block diagram illustrating a print option retrieving apparatus according to an example embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a print option retrieving apparatus 100 usable with an image forming system according to an example embodiment of the present general inventive concept. The image forming system may be a combination of the print option retrieving apparatus 100 and an image forming apparatus 10 to generate data to be printed and/or to form an image on a printing medium according to the data.

Referring to FIG. 1, the print option retrieving apparatus 100 converts data of an original document into a printer language suitable for interpretation by the image forming apparatus 10 using a driver 170 installed therein, and sends the data to the image forming apparatus 10. The print option retrieving apparatus 100 may implement any device installed with the driver 170 of the image forming apparatus 10, such as a personal computer (PC), laptop computer, etc.

The image forming apparatus 10 operates to form an image on a printing medium, using emulation that corresponds to the converted printer language. The image forming apparatus 10 may be implemented as a multi-function unit which includes printing device, or printing function. The print option retrieving apparatus 100 and the image forming apparatus 10 may be connected with wire or wirelessly for communication.

The print option retrieving apparatus 100 according to an example embodiment of the present general inventive concept may included a user input unit 110, a display unit 120, a main control unit 130, a ROM 140, a RAM 145, an application program unit 150, a storage unit 160, a driver 170, and a communication interface unit 180.

The user input unit 110 operates as an interface to receive one or more functions supported by the print option retrieving apparatus 100 from a user and to request the functions to the main control unit 130. The user input unit 110 may be implemented as a keyboard, a mouse, a plurality of buttons, or a touch panel. For example, the user input unit 110 may output to the main control unit 130 a signal to request document printing, a signal to set one or more print options, or a signal to add one or more bookmarks.

The display unit 120 displays a document being written by the operation program unit 150, a user interface menus provided by the driver 170, or an operational status of the print option retrieving apparatus 100. The display unit 120 may use a variety of display panels such as a liquid crystal display (LCD) or cathode ray tube (CRT).

The main control unit 130 executes overall operations of the print option retrieving apparatus 100 using various control programs which are stored in advance. For example, the main control unit 130 may control the driver 170 to run the programs associated with a printer driver (e.g., driver 170) in response to a request input through the user input unit 110 to print out a document written by the application program.

The ROM 140 stores therein basic information to check out components of the print option retrieving apparatus 100 and other control programs. The RAM 145 may load and store application programs to be run by the main control unit 130, or store data processed by the main control unit 130.

The application program unit 150 provides application programs through which a user can write, create, modify, or edit a variety of documents. In one example, a user may select a "print" menu from the functions provided by the application program unit 150 to set one or more basic functions associated with the printing.

The storage unit 160 stores application programs associated with the application program unit 150, or programs associated with the printer driver 170. The storage unit 160 may be implemented as a high capacity storage medium such as hard disk drive (HDD).

The storage unit 160 may also store one or more print files being generated by the driver 170. The print file includes one or more printer languages that are converted to be recognized by the image forming apparatus 10 based on a document to print, and one or more print options associated with the document to print. The printer languages may include printer control language, PCL6, PostScript, or GDI.

The storage unit 160 may store a bookmark list of the one or more bookmarks associated with the print options being set through the driver 170 according to a bookmark function thereof. The print options supported by the bookmark function enable a user to find previously set print options with ease and convenience whenever the user needs to use such options.

The driver 170 may be installed in the print option retrieving apparatus 100 to drive the image forming apparatus 10 connected with the print option retrieving apparatus 100. The driver 170 may include a converting unit 172, a graphic user interface (GUI) generating unit 174, and a driver control unit 176.

The converting unit 172 converts a document to be printed and the print options set through the GUI generating unit 174, which will be explained below, into a printer language recognizable by the image forming apparatus 10, and generates the converted printer language into a file. The print files may be named automatically following the corresponding documents to be printed, or it may be designated by a user. A plurality of types of documents may be printed, including a document written by the application program unit 150, a document electronically received from an external apparatus, or the like. The print files are then transmitted to the image forming apparatus 10 through the communication interface unit 180, printed onto a printing medium using a printing unit of the image forming apparatus 10, and stored to the storage unit 160. A conventional printing unit can be used as the printing unit of the image forming apparatus 10.

The GUI generating unit 174 generates a screen to set one or more print options provided by the driver 170. The print options relate to defaults or user set values of items related with the printing of a document, including, a range of printing, paper orientation, the number of printing pages, quality, or watermarks. For example, one set of the print options may include an entire page as the range of printing, portrait as the paper orientation, and one page as the printing pages, and the set of print options may be added to a bookmark list.

The user may request the addition of a set of print options used in the previous printing to the bookmark list as a new bookmark. Accordingly, the driver 170 is able to retrieve the previously used set of print options from the print file generated by the converting unit 172 and add the retrieved set to the bookmark list.

Figure 2:
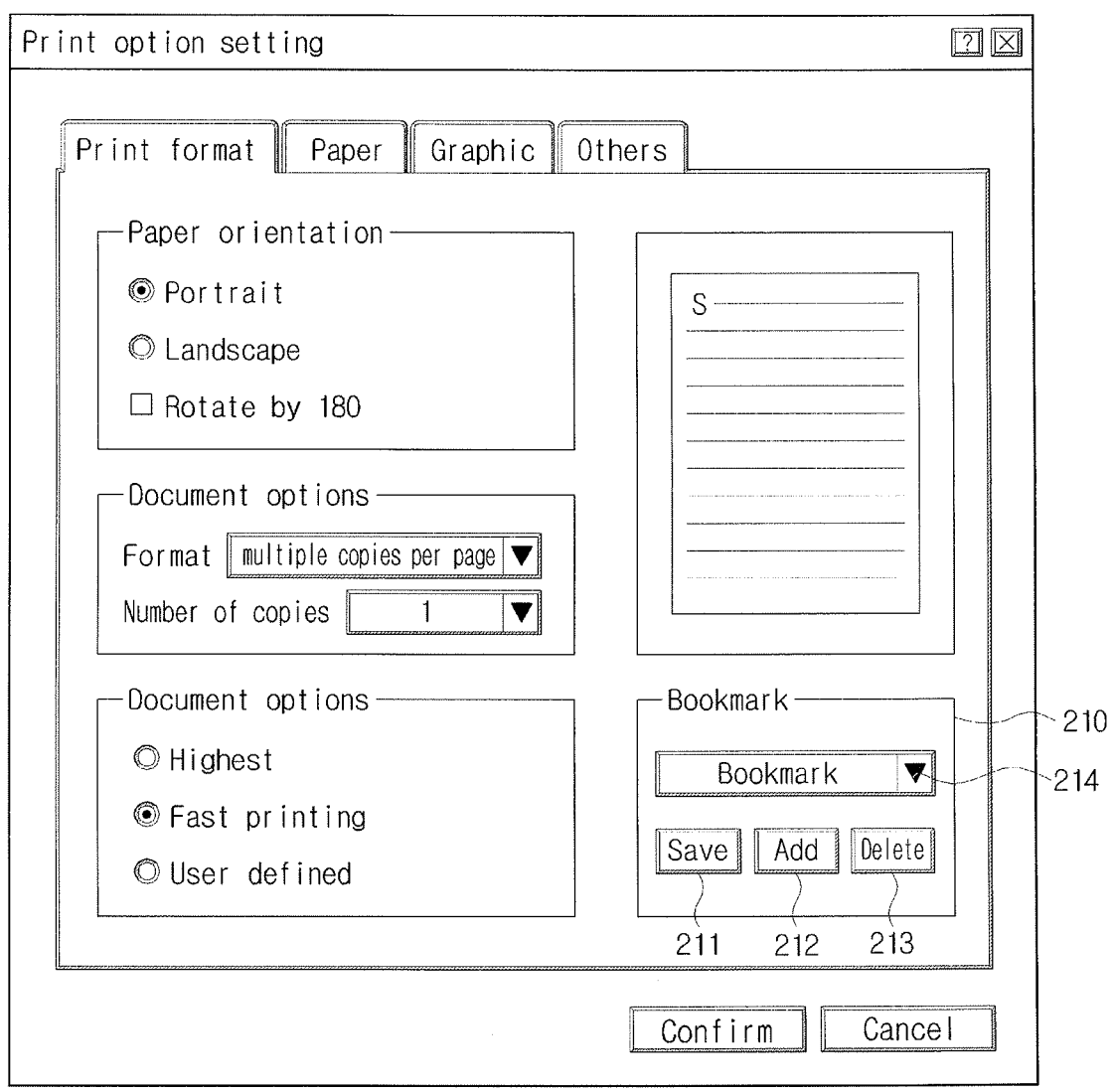
FIG. 2 illustrates an example of a menu to set bookmark function regarding the print options.
Figure 3:
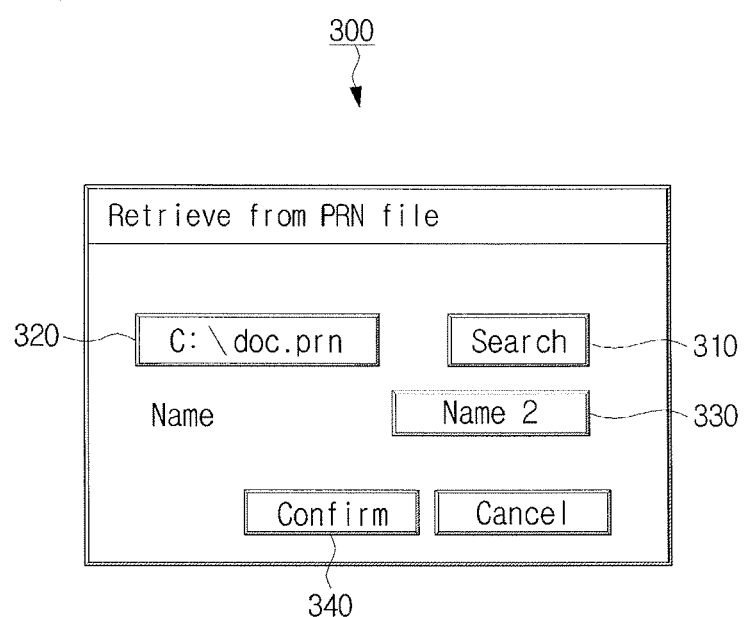
FIG. 3 illustrates an example of a popup window displayed for the retrieving of print options from a print filer.

FIG. 2 illustrates an example of a menu to set a bookmark function regarding the print options, and FIG. 3 illustrates an example of a popup window displayed for the retrieving of print options from a print file.

Referring to FIGS. 1 and 2, a print option setting screen 200 is a user interface that sets one or more print options for a document, and that receives a user request for retrieving the previously used set of print options. The user may set one or more print options of a new document to be printed through the print option setting screen 200, and instantly add the set of print options currently set through the print option setting screen 200 to the bookmark list by selecting a SAVE button 211.

The user may use an ADD button 212 to later add previously used set of print options to the bookmark for future use. The ADD button 212 is an interface that receives a user request to retrieve the previously used set of print options. As the ADD button 212 is pressed or selected, the GUI generating unit 174 generates a popup window 300 as illustrated in FIG. 3.

The popup window 300 is provided for a user to select and browse a print file from among a plurality of print files so that the user can retrieve print options from the selected print file. As a user presses a SEARCH button 310 by manipulating the user input unit 110, the GUI generating unit 174 generates a screen such as a window search, which shows the stored print files and paths of one or more folders each having the corresponding file. As a user selects a print file based on the displayed path, the popup window 300 shows the path of the selected print file in the path display area 320.

A naming area 330 is where a user inputs a name of the set of print options being retrieved from the selected print file. The driver control unit 176 may display the name of the print option set automatically or according to the print options. The user may change the automatically given name if necessary. For example, the user may directly input the name of the set of the print options in the naming area 330. The name may be a name representing a bookmark to be added to the bookmark list.

As a CONFIRM button 340 is selected, the name of the file set as illustrated in FIG. 3 is added to the bookmark area 210 of FIG. 2, and the corresponding set of print options is stored to the storage unit 160. When a user selects a combo box 214, the name of the file selected through the popup window 300 is indicated in one or more sub-menus. A DELETE button 213 may be used to delete at least one of the files from the bookmark list.

The driver control unit 176 controls the operations of the converting unit 172 and the GUI generating unit 174. For example, in response to a printing request received from the main control unit 130, the driver control unit 176 controls the GUI generating unit 174 to generate and display the print option setting screen 200, and also controls the converting unit 172 to convert the print option, set through the GUI generating unit 174, and the data of a document, into a print file.

If a print file is selected as illustrated in FIG. 3, the driver control unit 176 searches the selected print file, parses the searched print file, and retrieves the print options thereof. The print options set in printing the previous document may be retrieved.

The driver control unit 176 automatically gives name for the retrieved set of print options and adds it to the bookmark list of the storage unit 160. In automatic naming of the files, the driver control unit 176 may adopt various systems, including matching with the file name, or forming name in the order of Korean language alphabets, English language alphabets, numerals, or the like. The driver control unit 176 names the retrieved set of print options based on the name input through the name setting area 330 and then causes the print option set to be stored in the category of bookmarks of the storage unit 160.

If one from the bookmark list is selected from the combo box 214, the driver control unit 176 checks the set of print options, which is mapped and stored under the selected name from the storage unit 160, and controls the GUI generating unit 174 to apply the checked print options to the print option setting screen 200. For example, if a set of print options under the name of 'test' is selected, including 'landscape' as paper orientation, and '2 pages' as copies per page, the GUI generating unit 174 generates a signal representing the print option setting screen 200 to display 'landscape' as paper orientation, and '2 pages' as copies per page, and outputs the signal to the display unit 120.

Referring back to FIG. 1, the communication interface unit 180 supports interfacing between the print option retrieving apparatus 100 and the image forming apparatus 10 under the control of the main control unit 130. For one example, the communication interface unit 180 may transmit the print files being output from the driver 170 to the image forming apparatus 10, and receive information, such as printing status or other status thereof, from the image forming apparatus 10.

When the bookmark is selected from the bookmark list, the one or more print options included in the selected bookmark are automatically associated with the printing data representing the document, and data as a combination of the one or more print options and the printing data is transmitted to the image forming apparatus 10 to print an image according to the print options and printing data.

Figure 4:
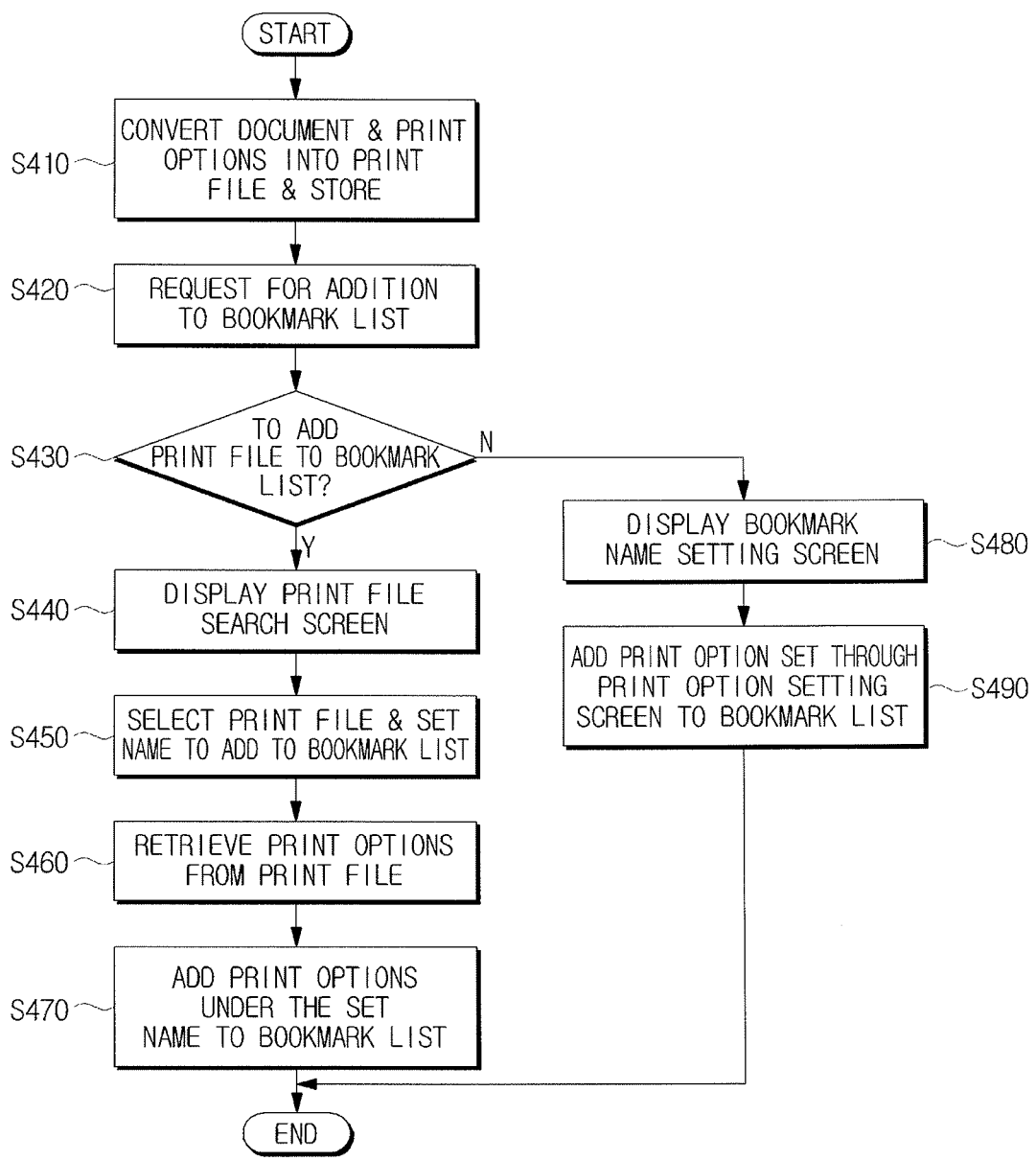
FIG. 4 is a flowchart illustrating a method of retrieving print options from a print file according to the print option retrieving apparatus of FIG. 1.

FIG. 4 is a flowchart illustrating a method of retrieving print option in an image forming system of FIGS. 1, 2, and 3.

Referring to FIGS. 1 to 4, in response to a printing request received through the user input unit 110, at operation S410, the converting unit 172 converts a document and a preset print option into a print file, the storage unit 160 stores the converted print file, and the communication interface unit 180 transmits the print file to the image forming apparatus 10. The image forming apparatus 10 converts the print file into a printable format and prints it on a paper.

At operation S420, if a user requests the bookmark addition through the print option setting screen 200, the driver control unit 176 at operation S430 determines whether the request is input through the selection of the ADD button 212 from the print option setting screen 200. In other words, the driver control unit 176 determines whether it has been requested to retrieve a set of print options from a print file and add it to the bookmark list.

If the ADD button 212 is pressed or selected at operation S430, the driver control unit 176 at operation S440 controls the GUI generating unit 174 to generate the popup window 300 to search a print file. Accordingly, the popup window 300 is generated and displayed in the display unit 120.

At operation S450, if a print file to retrieve print options is selected on the popup window 300, and a name is provided for the retrieved set of print options, the driver control unit 176 at operation S460 parses the selected print file and retrieves print option from the parsed print file. The driver control unit 176 may automatically provide names, or a user may input names for the print options to add to the bookmark list.

After operation S460, the driver control unit 176 at operation S470 causes the print option under the name selected at operation S450 to be added to the bookmark list and stored in the storage unit 160. In response to a user selecting the combo box 214 in the print option setting screen 200, the name of the print option, which is added to the bookmark list at operation S470, is displayed for the user to select. Accordingly, the user is enabled to request repeatedly the printing of the same or different document using the preset print option.

At operation S430, if SAVE button 211 is determined to have been selected, the driver control unit 176 determines that a request has been made prior to operation S420 to add the print options set in the print option setting screen 200 to the bookmark list. Accordingly, at operation S480, the driver control unit 176 controls the GUI generating unit 174 to generate a screen through which a name is given for the set of currently selected print options to add to the bookmark list.

If the name of the set of print options is input through a screen (not illustrated) displayed by operation S480, the driver control unit 176 at operation S490 causes the set of print options, which is currently set through the print option setting screen 200, to be added to the bookmark list and stored in the storage unit 160.

As a result, a user is enabled to add not only the print files, but also the set of currently chosen print options to the bookmark list.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains. The method illustrated in the figures can be stored in the computer-recorded medium in a from of computer-readable codes to perform the method when the computer reads the computer-readable codes of the recording medium.

With an apparatus and a method to retrieve print options from a print file according to the example embodiments of the present general inventive concept, print options used in the previous printing of a document can be retrieved from the print file and used repeatedly in the printing of the same or different documents. As a result, user inconvenience of having to set the print options in every printing is resolved, and simple and fast printing is enabled.

According to the example embodiments of the present general inventive concept, it is possible to add the retrieved set of print options to the bookmark list and store the same. As the bookmark list is provided to a user, including the retrieved sets of print options, the user is able to select desired set of print options from the list for use in the printing of a document.

According to the example embodiments of the present general inventive concept, the set of print options to be added to the bookmark list is named automatically, or named by a user. As a result, user convenience increases.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer-implemented apparatus configured to execute functional units to retrieve print options in an image forming system, comprising:
   a converting unit to convert a document to print, and a set of one or more print options selected for the document to print, into a print file recognizable at an image forming apparatus; and
   a control unit to retrieve the set of print options from the print file, such that a print option setting menu is generated to display a bookmark list to correspond to the set of print options.

2. The apparatus of claim 1, further comprising:
   a graphic user interface (GUI) generating unit to generate the print option setting menu to set the one or more print options for the document to print, and to receive a command to retrieve the set one or more print options.

3. The apparatus of claim 2, wherein the GUI generating unit generates a popup window to select the print file from which the set of print options is to be retrieved, in response to the command to retrieve the print options.

4. The apparatus of claim 3, wherein the GUI generating unit generates the popup window that includes an area to receive a name of the retrieved set of print options to add to a bookmark list.

5. The apparatus of claim 4, wherein the control unit names the retrieved set of print option automatically or gives a name based on the corresponding print options, and displays the name of the retrieved set of print options in the area.

6. The apparatus of claim 2, wherein the GUI generating unit generates the print option setting menu to display the bookmark list to correspond to the set of print options.

7. The apparatus of claim 1, wherein the control unit adds the retrieved set of print options to the bookmark list.

8. The apparatus of claim 7, further comprising:
a storage unit to additionally store the retrieved set of print options to the bookmark list.

9. A method of retrieving print options in an image forming system, the method comprising:
converting a document to print and one or more print options set for the document to print, into a print file recognizable at an image forming apparatus; and
retrieving the print options from the print file, such that a print option setting menu is generated to display a bookmark list to correspond to the print options.

10. The method of claim 9, further comprising:
generating the print option setting menu to set the one or more print options for the document to print, and to receive a command to retrieve the set print options.

11. The method of claim 10, further comprising:
displaying a popup window to select the print file from which the set of print options is to be retrieved, in response to the command to retrieve the set of print options.

12. The method of claim 11, wherein the popup window includes an area to receive a name of the retrieved set of print options to add to the bookmark list.

13. The method of claim 12, wherein the generating and displaying comprises naming the retrieved set of print options automatically or giving a name based on the corresponding print options, and displaying the name of the retrieved set of print options in the area.

14. The method of claim 10, wherein the displaying the print option setting menu comprises generating the print option setting menu to display the bookmark list to correspond to the set of print options.

15. The method of claim 9, further comprising:
adding the retrieved set of print options to the bookmark list.

16. The method of claim 15, further comprising:
additionally storing the retrieved set of print options to the bookmark list.

17. A non-transitory computer-readable medium to contain computer-readable codes as a program to execute a method of retrieving print options in an image forming system, the method comprising:
converting a document to print and one or more print options set for the document to print, into a print file recognizable at an image forming apparatus; and
retrieving the print options from the print file, such that a print option setting menu is generated to display a bookmark list to correspond to the print options.

18. A computer-implemented image forming system apparatus configured to execute functional units to retrieve print options, comprising:
a control unit to generate a bookmark list including one or more bookmarks each corresponding to a print file containing a document to print and a set of one or more print options selected by a user; and
a GUI generating unit to generate a window including the bookmark list to be displayed, such that a print option setting menu is generated to display the bookmark list to correspond to the set of print options.

19. The image forming system of claim 18, further comprising:
a GUI generating unit to generate a window to include the one or more print options, wherein the window includes the bookmark list, and when one of the bookmarks is selected from the bookmark list, the one or more print options are automatically set according to the selected bookmark.

20. The image forming system of claim 18, further comprising:
a driver control unit to retrieve one of the bookmarks from the bookmark list, to set the one or more print options according to the selected bookmark, and to transmit the one or more print options and printing data to an image forming apparatus.

21. A method of an image forming system, the method comprising:
converting a document to print, and a set of one or more print options selected for the document to print, into a print file recognizable at an image forming apparatus; and
generating a bookmark list including one or more bookmarks, and retrieving the set of print options from the respective bookmarks, so that the document and the retrieved set of the print options associated with the document are converted into the print file, such that a print option setting menu is generated to display the bookmark list to correspond to the set of print options.

\* \* \* \* \*